(12) United States Patent
Chang et al.

(10) Patent No.: US 10,637,140 B2
(45) Date of Patent: Apr. 28, 2020

(54) APPARATUS AND METHOD FOR CONTROLLING ADAPTIVE BEAMFORMING GAIN IN WIRELESS COMMUNICATION SYSTEM

(71) Applicant: Samsung Electronics Co., Ltd., Suwon-si, Gyeonggi-do (KR)

(72) Inventors: Young-Bin Chang, Anyang-si (KR); Rakesh Taori, Suwon-si (KR); Jeong-Ho Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 198 days.

(21) Appl. No.: 15/332,333

(22) Filed: Oct. 24, 2016

(65) Prior Publication Data

US 2017/0040685 A1 Feb. 9, 2017

Related U.S. Application Data

(63) Continuation of application No. 13/780,561, filed on Feb. 28, 2013, now Pat. No. 9,478,857.

(30) Foreign Application Priority Data

Mar. 2, 2012 (KR) .................. 10-2012-0021854
Feb. 28, 2013 (KR) .................. 10-2013-0021894

(51) Int. Cl.
*H01Q 3/34* (2006.01)
*H01Q 1/24* (2006.01)
(Continued)

(52) U.S. Cl.
CPC .............. *H01Q 3/34* (2013.01); *H01Q 1/246* (2013.01); *H01Q 25/00* (2013.01);
(Continued)

(58) Field of Classification Search
CPC ........... H01Q 3/26; H01Q 3/34; H01Q 1/246; H01Q 25/00; H01Q 1/52; H04B 7/0617; H04B 7/10; H04W 16/28
(Continued)

(56) References Cited

U.S. PATENT DOCUMENTS 6,498,939 B1 12/2002 Thomas
7,245,880 B1 7/2007 Jacobsen
(Continued)

FOREIGN PATENT DOCUMENTS

CN 1499869 A 5/2004
CN 1808942 A 7/2006
(Continued)

OTHER PUBLICATIONS

NTT Docomo, Investigation on Adaptive Beamforming in E-UTRA Downlink, R1-072425, 3GPP TSG RAN WG1 Meeting #49, Kobe, Japan, May 7-11, 2007.
(Continued)

*Primary Examiner* — Harry K Liu
(74) *Attorney, Agent, or Firm* — Jefferson IP Law, LLP

(57) ABSTRACT

An apparatus and a method for controlling a beamforming gain in a wireless communication system are provided. The method includes determining whether to control a beamforming gain, controlling the beamforming gain via change of a beam width if it is determined to control the beamforming gain, and transmitting or receiving a signal according to the controlled beamforming gain.

26 Claims, 16 Drawing Sheets

(51) Int. Cl.
*H01Q 25/00* (2006.01)
*H04B 7/06* (2006.01)
*H04W 52/42* (2009.01)

(52) U.S. Cl.
CPC ......... *H04B 7/0617* (2013.01); *H04B 7/0628* (2013.01); *H04W 52/42* (2013.01)

(58) Field of Classification Search
USPC ........................................................ 342/367
See application file for complete search history.

(56) References Cited

U.S. PATENT DOCUMENTS

| | | | |
|---|---|---|---|
| 7,283,092 B2 | 10/2007 | Feng et al. | |
| 7,386,305 B2 | 6/2008 | Etkin et al. | |
| 7,447,523 B2 | 11/2008 | Goldberg et al. | |
| 7,609,661 B2 | 10/2009 | Chae et al. | |
| 7,719,993 B2 | 5/2010 | Li et al. | |
| 7,792,204 B2 | 9/2010 | Shin et al. | |
| 7,898,478 B2 | 3/2011 | Niu et al. | |
| 2002/0123343 A1 | 9/2002 | Wiedeman et al. | |
| 2002/0168946 A1 | 11/2002 | Aizawa et al. | |
| 2004/0137952 A1 | 7/2004 | Umesh et al. | |
| 2006/0033659 A1 | 2/2006 | Strickland | |
| 2007/0184836 A1 | 8/2007 | He | |
| 2008/0005219 A1 | 1/2008 | Nabar et al. | |
| 2008/0012764 A1 | 1/2008 | Kang et al. | |
| 2008/0031387 A1 | 2/2008 | Shin et al. | |
| 2009/0051592 A1 | 2/2009 | Lee et al. | |
| 2010/0131813 A1 | 5/2010 | Kim et al. | |
| 2010/0142462 A1* | 6/2010 | Wang ..................... | H04B 7/024 370/329 |
| 2010/0164802 A1 | 7/2010 | Li et al. | |
| 2010/0164805 A1 | 7/2010 | Niu et al. | |
| 2010/0234071 A1* | 9/2010 | Shabtay ............... | H04B 7/0408 455/562.1 |
| 2011/0065448 A1* | 3/2011 | Song .................... | H04B 7/0632 455/452.2 |
| 2011/0211490 A1 | 9/2011 | Nikula et al. | |
| 2011/0273993 A1 | 11/2011 | Mazzarese et al. | |
| 2012/0190378 A1* | 7/2012 | Han ..................... | H04B 7/0639 455/452.2 |
| 2012/0281744 A1 | 11/2012 | Guo et al. | |
| 2012/0287797 A1* | 11/2012 | Basson ................ | H04W 16/28 370/252 |
| 2016/0099763 A1* | 4/2016 | Chen ..................... | H04B 7/063 370/329 |

FOREIGN PATENT DOCUMENTS

| | | |
|---|---|---|
| EP | 1 071 228 A1 | 1/2001 |
| KR | 10-2008-0012416 A | 2/2008 |
| KR | 10-2011-0069176 A | 6/2011 |

OTHER PUBLICATIONS

European Office Action dated Oct. 9, 2018; Application: 13 754 757.6-1220; Ref.: P6052723PCT/EP.
Korean Office Action with English translation dated Jan. 7, 2019; Korean Appln. No. 10-2013-0021894.
European Office Action dated Dec. 13, 2019, issued in European Patent Application No. 13754757.6.
Korean Office Action dated Jun. 12, 2019, issued in Korean Patent Application No. 10-2013-0021894.
European Office Action dated Jul. 2, 2019, issued in European Patent Application No. 13 754 757.6.
Korean Office Action dated Sep. 2, 2019, issued in Korean Patent Application No. 10-2013-0021894.

* cited by examiner

APPARATUS AND METHOD FOR CONTROLLING ADAPTIVE BEAMFORMING GAIN IN WIRELESS COMMUNICATION SYSTEM

PRIORITY

This application is a continuation application of prior application Ser. No. 13/780,561, filed Feb. 28, 2013, which will issue as U.S. Pat. No. 9,478,857 on Oct. 25, 2016, which claims the benefit under 35 U.S.C. § 119(a) of Korean patent applications filed in the Korean Intellectual Property Office on Mar. 2, 2012 and Feb. 28, 2013 and assigned Serial Nos. 10-2012-0021854 and 10-2013-0021894, respectively, the entire disclosures of which are hereby incorporated by reference.

BACKGROUND OF THE INVENTION

1. Field of the Invention

The present invention relates to a beamforming in a wireless communication system.

2. Description of the Related Art

A transmission end of a wireless communication system may generate and transmit an electric signal using an antenna, and a reception end of the wireless communication system may receive an electric signal transmitted by the transmission end via a radio channel. As a model for a gain of a received signal at the reception end that may be obtained via a beamforming gain at a transmission/reception antenna, a Friis equation may be used.

FIG. 1 illustrates a transmission end and a reception end of a wireless communication system according to the related art.

Referring to FIG. 1, a transmission end 110 and a reception end 120 of the related-art wireless communication system are shown. In a case where a transmission antenna having a beamforming gain $G_t$ and a reception antenna having a beamforming gain $G_r$ are separated by a distance d, the Friis equation is given by Equation 1.

$$P_r = P_t \frac{G_t G_r \lambda^2}{16\pi^2 d^2} \quad \text{Equation 1}$$

In Equation 1, $P_r$ is power of a reception signal, $P_t$ is power of a transmission signal, $G_t$ is an antenna gain of a transmitter, $G_r$ is an antenna gain of a receiver, $\lambda$ is the length of a wavelength, and d is a distance between the transmitter and the receiver. The antenna gain of the transmitter may be referred to as a transmission beamforming gain, and the antenna gain of the receiver may be referred to as a reception beamforming gain.

Equation 1 may be applicable to free space. Therefore, when it is applied to a real system, some change may be given to Equation 1 according to characteristics of a radio channel Equation 1 shows that power received in the receiver is proportional to a gain value of an antenna of the transmitter and the receiver. When transmission power and gain values of transmission beamforming and reception beamforming are raised via the Friis equation, a quality of a reception signal at the reception end may be improved.

FIG. 2 illustrates beam training in a wireless communication system according to the related art.

Referring to FIG. 2, a beamforming gain value at a Base Station (BS) 210 is expressed by $G_{BS}$ and a beamforming gain value at Mobile Station (MS) 220 is expressed by $G_{MS}$. Herein, an MS may be referred as a User Equation (UE) and may be any portable electronic terminal that may access a wireless communication system. In order to increase efficiency of a transmission signal and a reception signal between the BS 210 and the MS 220, a process for matching a direction of a signal of the BS 210 having a specific direction with a direction of a signal of the MS 220 is needed. Generally, the process for matching the directions of signals is referred to as beam training. The beam training is a procedure for maximizing a power value of a reception signal in the Friss equation described with reference to FIG. 1 by accurately matching the direction of a transmission signal with the direction of a reception signal.

A beam training procedure at a downlink is described below with reference to FIG. 2. The BS 210 having a $G_{BS}$, which is a fixed beamforming gain, transmits a unique sequence in a unique direction. The unique sequence is mapped to a beam index as 1:1, and the MS 220 may discriminate from which direction a best beam is received. The MS 220 may receive beams via a plurality of directions having a $G_{MS}$, which is a fixed beamforming gain with respect to one beam index of the BS 210, and may then determine from which direction a signal having a highest power may be received. The above procedure may be applicable to an uplink in the same manner. In this case, the transmission end becomes the MS 220, and the reception end becomes the BS 210. For example, as illustrated in FIG. 2, in the case where the BS 210 has five beam indexes beam_1 211, beam_2 212, beam_3 213, beam_4 214, and beam_5 215, and the MS 220 has three beam indexes beam_1 221, beam_2 222, and beam_3 223, since the beam_3 213 of the BS 210 and the beam_2 222 of the MS 220 face each other, a combination of the beam_3 213 of the BS 210 and the beam_2 222 of the MS 220 may maximize reception power at the reception end.

Through the above beam training, an optimized beam index at the transmission end and an optimized beam index at the reception end may be determined so that reception power at the reception end may be maximized. The above beam training procedure may be performed periodically or may be event-driven. Generally, in the case where an MS has mobility, the beam training procedure is performed periodically, and in this case, when the beam training procedure is performed in a short period, a training overhead may be very large. Therefore, when maximization of power may be achieved more effectively during beam training, an overhead by the beam training procedure may be reduced.

Therefore, a need exists for a system and method for controlling adaptive beamforming gain in a wireless communication system.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide an apparatus and a method for performing efficient beamforming in a wireless communication system.

Another aspect of the present invention is to provide an apparatus and a method for reducing an overhead by a beam training procedure in a wireless communication system.

Still another aspect of the present invention is to provide an apparatus and a method for controlling a beam gain in a wireless communication system.

In accordance with an aspect of the present invention, a method for operating a communication node in a wireless communication system is provided. The method includes determining whether to control a beamforming gain, controlling the beamforming gain via change of a beam width if it is determined to control the beamforming gain, and transmitting or receiving a signal according to the controlled beamforming gain.

In accordance with another aspect of the present invention, a method for operating a communication node in a wireless communication system is provided. The method includes determining whether to control a beamforming gain of a counterpart node, and transmitting a message indicating a beamforming gain control to the counterpart node if it is determined to control the beamforming gain.

In accordance with further another aspect of the present invention, a communication node apparatus in a wireless communication system is provided. The apparatus includes a controller for determining whether to control a beamforming gain and for controlling the beamforming gain via change of a beam width if it is determined to control the beamforming gain, and a communication unit for transmitting or receiving a signal according to the controlled beamforming gain.

In accordance with still another aspect of the present invention, a communication node apparatus in a wireless communication system is provided. The apparatus includes a controller for determining whether to control a beamforming gain of a counterpart node, and a communication unit for transmitting a message indicating a beamforming gain control to the counterpart node if it is determined to control the beamforming gain of the counterpart node.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The present invention relates to an apparatus and method for controlling adaptive beamforming gain in a wireless communication system. Exemplary embodiments of the present invention provide a technology for performing beamforming more efficiently in a wireless communication system. Hereinafter, the present exemplary embodiments are described using an Orthogonal Frequency Division Multiplexing (OFDM) and/or an Orthogonal Frequency Division Multiple Access (OFDMA) wireless communication system as an example. However, the present invention is not limited thereto, and the exemplary embodiments may be applied to any suitable and or similar wireless communication system using beamforming.

According to an exemplary embodiment of the present invention, when an index of a beam is determined via a beam training procedure, at least one of a transmission end and a reception end may control a beamforming gain without changing a direction of the beam. For controlling the beamforming gain, the transmission end or the reception end may increase the beamforming gain by controlling a beam width.

Figure 1:
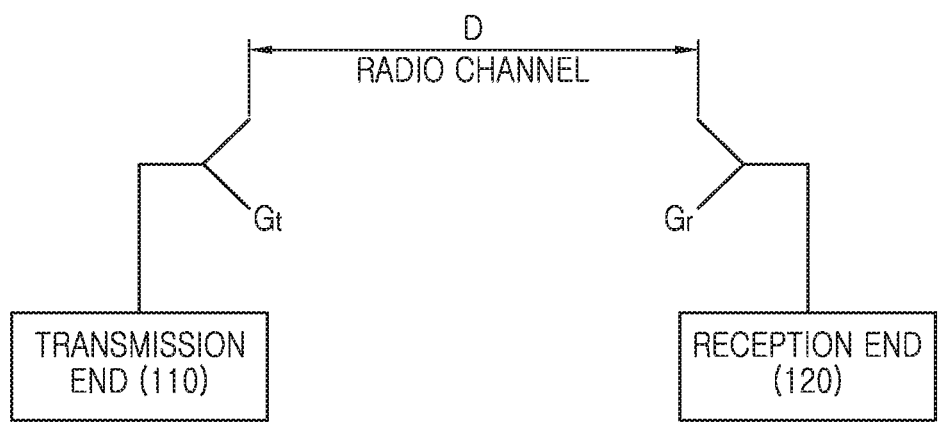
FIG. 1 illustrates a transmission end and a reception end of a wireless communication system according to the related art.
Figure 2:
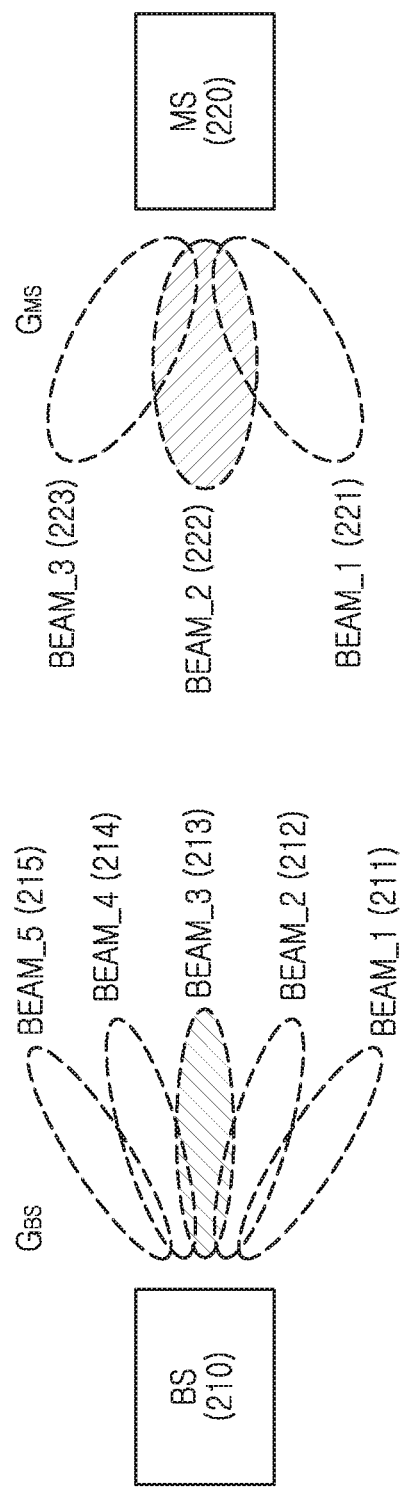
FIG. 2 illustrates beam training in a wireless communication system according to the related art.
Figure 3:
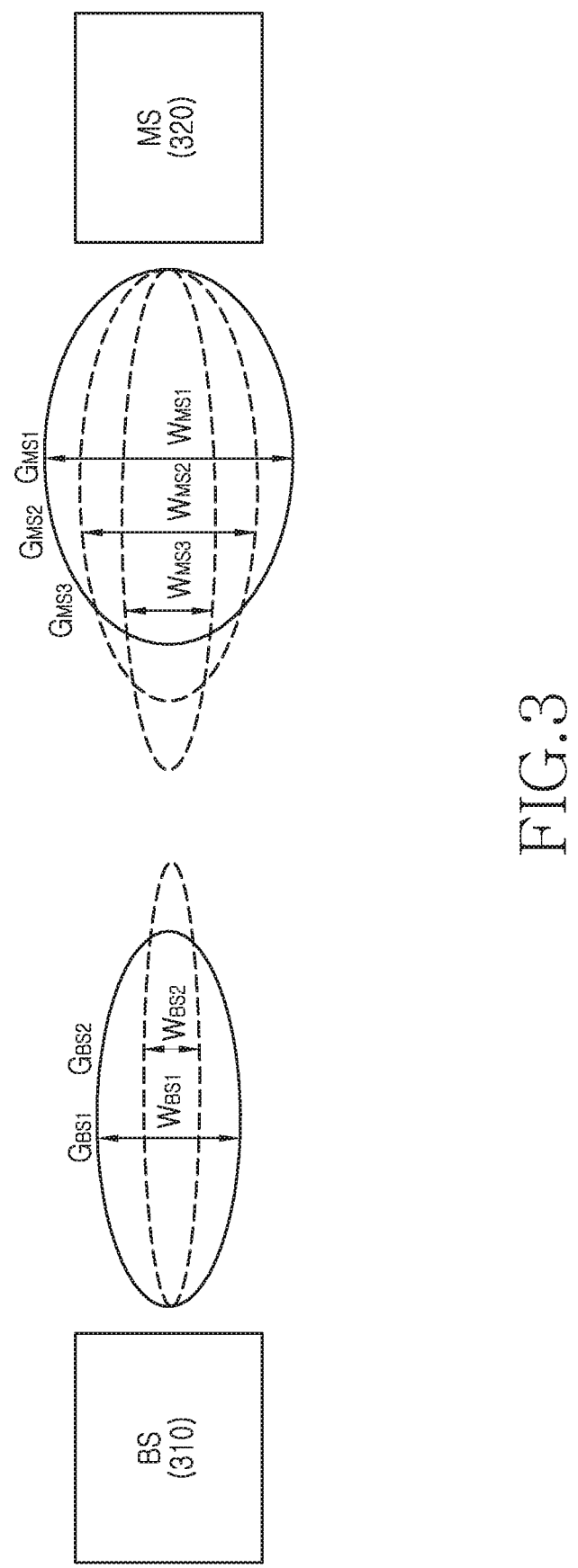
FIG. 3 illustrates a relation between a beam width and a beamforming gain in a wireless communication system according to an exemplary embodiment of the present invention.

FIG. 3 illustrates a relation between a beam width and a beamforming gain in a wireless communication system according to an exemplary embodiment of the present invention.

Referring to FIG. 3, in a Base Station (BS) 310, a beamforming gain value corresponding to a beam width of $W_{BS1}$ may be expressed by $G_{BS1}$, and a beamforming gain value corresponding to a beam width of $W_{BS2}$ may be expressed by $G_{BS2}$. Also, in a Mobile Station (MS) 320, a beamforming gain value corresponding to a beam width of $W_{MS1}$ may be expressed by $G_{MS1}$, a beamforming gain value corresponding to a beam width of $W_{MS2}$ may be expressed by $G_{MS2}$, and a beamforming gain value corresponding to a beam width of $W_{MS3}$ may be expressed by $G_{MS3}$. At this point, relations of '$W_{BS1}>W_{BS2}$' and '$G_{BS1}<G_{BS2}$' are met and relations of '$W_{MS1}>W_{MS2}>W_{MS3}$' and '$G_{MS1}<G_{MS2}<G_{MS3}$' are met. That is, the beam width and the beamforming gains are inversely proportional to each other.

In the present exemplary embodiment, it may be assumed that a fixed beamforming gain value at the BS 310 is applied to beam training is $G_{BS1}$ and a gain value of a fixed beamforming at the MS 320 is $G_{MS1}$. The BS 310 and the MS 320 may determine beam indexes at states of the beamforming gains $G_{BS1}$ and $G_{MS1}$. After determining the beam indexes, the BS 310 and the MS 320 may increase a beamforming gain value by controlling a beam width. For example, when the BS 310 controls a beam width using $W_{BS2}$, then the beamforming gain increases to $G_{BS2}$. Also, when the MS 320 controls a beam width using $W_{MS3}$, then the beamforming gain increases to $G_{MS3}$. When a beamforming gain increases, a reception power value at a reception end increases even more. Therefore, according to the present exemplary embodiment, a technique for adaptively controlling a gain value of beamforming by controlling a beam width is provided.

As illustrated in FIG. 3, the BS 310 and the MS 320 may control a beamforming gain by controlling a beam width. Since the beamforming of the present exemplary embodiment forms a beam by changing a phase for each antenna, the control of the beam width may also be performed by changing of a phase for each antenna. Therefore, in order to control the beam width, the MS 320 may possess a set of a plurality of phase combinations. In a case of digital beamforming, the phase combination may be denoted by a precoding matrix.

The set of phase combinations may be stored in the MS 320 in advance. However, the present invention is not limited thereto, and the set of phase combinations may be provided as system information from the BS 310, or may be provided in any similar and/or suitable manner. Also, according to another exemplary embodiment of the present invention, the set of phase combinations may change under a control of a BS.

Figure 4:
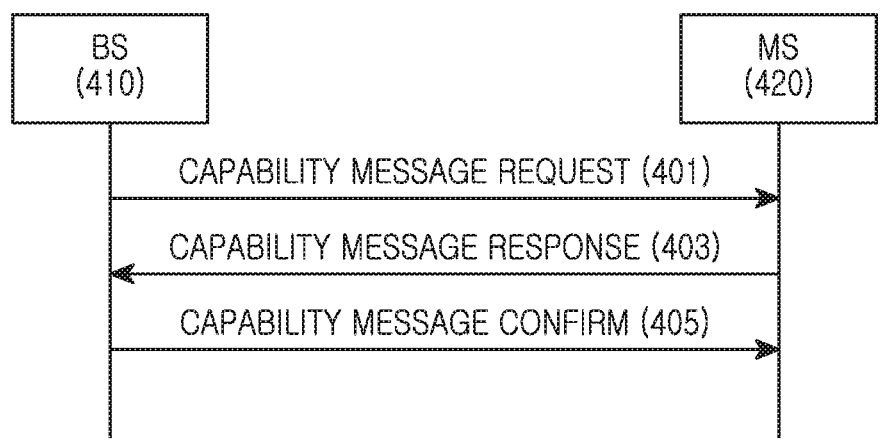
FIG. 4 illustrates signal exchange for providing beamforming related capability information in a wireless communication system according to an exemplary embodiment of the present invention.

FIG. 4 illustrates signal exchange for providing beamforming related capability information in a wireless communication system according to an exemplary embodiment of the present invention.

Referring to FIG. 4, a procedure for providing information regarding the beamforming related capability includes three steps 401, 403, and 405. Among the three steps, one of step 401 and step 405 may be omitted but the BS should obtain a beamforming related capability of an MS 420 via the procedure of step 403. The procedure for providing information regarding the beamforming related capability illustrated in FIG. 4 may be performed as a portion of a network entry procedure. Particularly, the procedure for providing information regarding the beamforming related capability illustrated in FIG. 4 may be performed as a portion of capability negotiation of the network entry procedure. Each step illustrated in FIG. 4 is described below specifically.

A BS 410 may request MS 420 to transmit information regarding beamforming related capability in step 401. That is, the base station 410 transmits a capability message request to the MS 420. The capability message request indicates a requested item. For example, the capability message request may include a field represented in Table 1.

TABLE 1

| Field | Descriptions |
| --- | --- |
| Beamforming Capability Information | Information on beamforming that an MS may support. |

For another example, the capability message request may include at least one of fields represented in Table 2.

TABLE 2

| Field | Descriptions |
| --- | --- |
| Beamforming Gain | A request for information on beamforming gains that an MS may support. |
| Number of Beams | A request for information on the number of beamforming directions that an MS may support. |

The MS 420 may transmit the information regarding the beamforming related capability to the base station 410 in step 403. In other words, the MS 420 transmits a capability message response to the base station 410. The capability message response may include information regarding a control range of a beamforming gain. For example, the capability message response may include at least one of fields represented in Table 3, Table 4, or Table 5.

TABLE 3

| Field | Descriptions |
| --- | --- |
| Number of Beams | A request for information on the number of beamforming directions that an MS may support. |
| Maximum Beamforming Gain | Maximum value among beamforming gains that an MS may support. |
| Minimum Beamforming Gain | Minimum value among beamforming gains that an MS may support. |

TABLE 3-continued

| Field | Descriptions |
| --- | --- |
| Beamforming Gain Step | A difference between two adjacent beamforming gains that an MS may support. |

TABLE 4

| Field | Descriptions |
| --- | --- |
| Number of Beams | A request for information on the number of beamforming directions that an MS may support. |
| Number of Available Beamforming Gains | The number of beamforming gains that an MS may support. |
| $G_{MS1}$ | Gain value of first beamforming. |
| ... | |
| $G_{MSN}$ | Gain value of $N^{th}$ beamforming. |

TABLE 5

| Field | Descriptions |
| --- | --- |
| Number of Beams | A request for information on the number of beamforming directions that an MS may support. |
| Beamforming Precoding Matrix | Precoding matrix set that an MS may support. |

The base station 410 informs the MS 420 of beamforming related index information in step 405. In other words, the base station 410 transmits capability message confirm to the MS 420. For example, the capability message confirm may include at least one of fields represented in Table 6 and Table 7.

TABLE 6

| Field | Descriptions |
| --- | --- |
| Number of Beam Index | Number of indices mapped to beams that an MS may support. |
| Number of Beamforming Gain Index | Number of indices mapped to beamforming gains that an MS may support. |

TABLE 7

| Field | Descriptions |
| --- | --- |
| Number of Beam Index | Number of indices mapped to beams that an MS may support. |
| Index of Beamforming Precoding Matrix Set | Index of precoding matrix set that an MS may support. |

As in the procedure illustrated in FIG. 4, the base station 410 may adaptively control a gain value of beamforming of the MS 420 by obtaining the number of available beams, the number of beamforming gain values, and gain values of the MS 420, or by obtaining information regarding a precoding matrix for beamforming.

Figure 5:
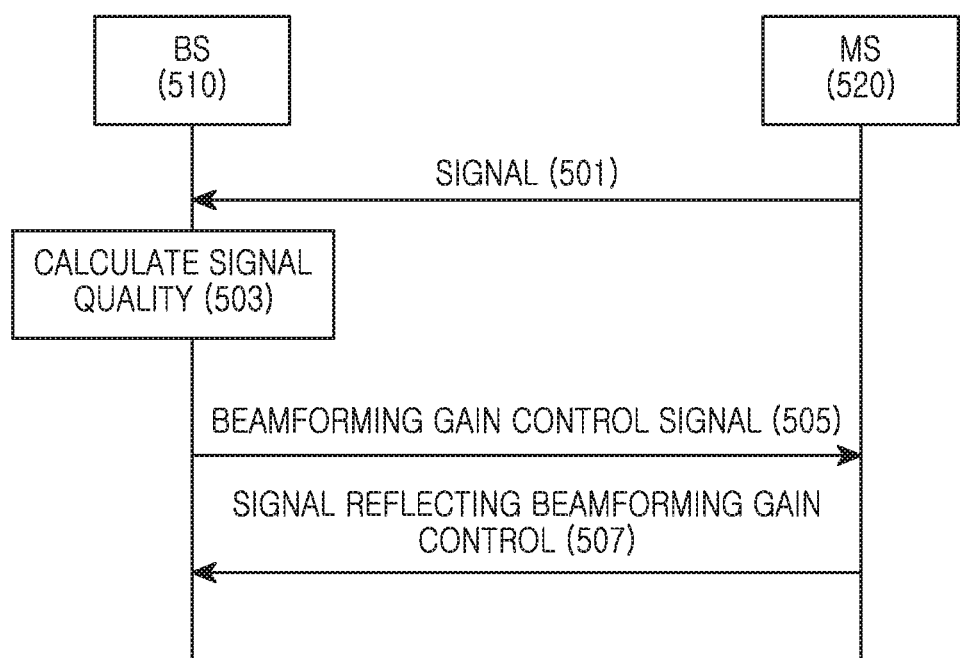
FIG. 5 illustrates an uplink transmission beamforming gain control in a wireless communication system according to an exemplary embodiment of the present invention.

FIG. 5 illustrates signal exchange for an uplink transmission beamforming gain control in a wireless communication system according to an exemplary embodiment of the present invention.

When beam training between a base station 510 and MS 520 is completed, at least one of a beam index, a beamforming direction, and a beamforming gain value at the MS 520 may be determined. The beam index may represent a beamforming direction and a beamforming gain value prescribed between the base station 510 and the MS 520. The beam direction and the beamforming gain value determined via the beam training procedure may be applied when the MS 520 transmits a signal to the base station 510. The beam index may not change until a subsequent beam training procedure is performed.

When transmitting uplink data, the MS 520 transmits a signal using a specific beam direction, a specific beamforming gain value GMS_T, and a specific power value PMS. Since the beamforming gain at the MS 520 may be a fixed value depending on a kind of beamforming, the MS 520 may improve reception signal quality at the base station 510 by controlling a transmission power value. However, according to an exemplary embodiment of the present invention, in a case where the MS 520 has a directional antenna, the MS 520 may adaptively control a beamforming gain value as well as the power value.

Referring to FIG. 5, the MS 520 transmits a signal to the base station 510 in step 501. At this point, a transmission beamforming gain of the signal is GMS_T. Next, the base station 510 calculates reception signal quality in step 503. The reception signal quality may be a value of a Received Signal Strength (RSS), a Signal-to-Noise Ratio (SNR), a Signal-to-Interface Ratio (SIR), a Signal-to-Interference and Noise Ratio (SINR), a Bit Error Rate (BER), a Packet Error Rate (PER), or any other similar and/or suitable value, or may be a deviation or a variance representing an average amount of change of the RSS, the SNR, the SIR, the SINR, the BER, the PER, or the any other similar and/or suitable value. However, the present invention is not limited thereto, and the reception signal quality may be a value representing mobility of the MS and may be a movement velocity or a change value of a position of the MS.

Next, in step 505, the base station 510 transmits a beamforming gain control message in order to increase or reduce a transmission beamforming gain to the MS 520. For example, in the case where the base station 510, which has received a Radio Frequency (RF) signal from the MS 520, determines that the reception signal quality is less than a predetermined threshold and the reception signal quality may be improved, the base station 510 may transmit a beamforming gain control message in order to increase a transmission beamforming gain by a specific value, $+\beta_t$, to the MS 520. On the contrary, when determining that the reception signal quality is greater than the predetermined threshold, the base station 510 may transmit a message in order to not change the beamforming gain or in order to reduce the beamforming gain by a specific value, $-\beta_t$, to the MS 520. $\beta_t$ has a real number value. In the case where the gain is not changed, $\beta_t$ may be set to '0'. In a case of raising or lowering the transmission beamforming gain, a Decibel (dB) unit may be used to express an increase or decrease amount of a transmission beamforming gain.

Also, the beamforming gain control message may include Beamforming Gain Control (BGC) information. According to an exemplary embodiment of the present invention, the BGC information may include one or more bits. For example, in a case where the BGC information includes 1 bit, '0' may be defined as a command to lower a transmission beamforming gain, and '1' may be defined as a command to increase the beamforming gain. For another example, in a case where the BGC information includes 2 bits, '00' may be defined as a command to lower the transmission beamforming gain, '11' may be defined as a command to increase the transmission beamforming gain, and '01' and '10' may be defined as a command to maintain the transmission beamforming gain. For still another example, in the case where the BGC information includes a plurality of bits, absolute values of the beamforming gain may be allocated to a plurality of bit combinations. For example, in the case where the BGC information includes 3 bits, '000' may be defined to indicate 0 dB, '001' to indicate +1 dB, '010' to indicate +2 dB, '011' to indicate +3 dB, '100' to indicate −1 dB, '101' to indicate −2 dB, and '110' to indicate −3 dB. For another example, in the case where "the number of beamforming gain indexes" field represented in Table 6 is used, a specific beamforming gain value may be allocated to a specific bit stream. For example, '00' may be allocated 0 dB, '01' may be allocated 5 dB, '10' may be allocated 10 dB, and '11' may be allocated 20 dB.

Also, in case of controlling the beamforming gain using $\beta_t$, since the direction of a signal transmitted by the MS 520 may change, a fine direction control parameter, $\alpha_t$, for beam direction control for more accurately controlling a beam direction that was originally determined in the beam training, and a beamforming gain may be transmitted. The fine direction control parameter $\alpha_t$ may be information representing at least one of a direction and an angle, or may be an index value representing at least one of a direction and an angle prescribed between the base station 510 and the MS 520. A specific value of a, may be determined as a value of a degree for controlling an error value of a beam direction generated due to beamforming gain control by $\beta_t$ without greatly changing the direction of the beam determined during the beam training process due to application of $\alpha_1$.

Also, since a transmission power value $P_{MS}$ may change according to $\beta_t$ and $\alpha_t$, information regarding an amount of change in the power value $\Delta P$ may be also included in the beamforming gain control signal. At this point, the base station 510 may not directly transmit $\beta_t$, $\alpha_t$, and $\Delta P$, but rather, other types of values may be used. For example, in order to control $\beta_t$, $\alpha_t$, and $\Delta P$, the base station 510 may use an index mapped to the beamforming gain and the direction prescribed between the base station 510 and the MS 520 or the base station 510 may use an index of a precoding matrix. In other words, the base station 510 may transmit the index instead of directly transmitting $\beta_t$, $\alpha_t$, and $\Delta P$. The precoding matrix may be formed of values capable of controlling the magnitude and phase of a digital signal at a digital end, or may be formed of values controlling the magnitude and phase of an analog signal at an end right before an antenna.

In step 507, the MS 520 may transmit a signal using a transmission beamforming gain controlled according to an indication of the base station 510. In other words, the MS 520 may transmit a signal reflecting the beamforming gain in step 507. That is, the transmission beamforming gain may be $G_{MS\_T}-\beta_t$ or $G_{MS\_T}+\beta_t$. For example, in a case of increasing the transmission beamforming gain, the MS 520 may reduce a width of a transmission beam. In a case of reducing the transmission beamforming gain, the MS 520 may increase the width of the transmission beam. In other words, the MS 520 may form a transmission beam according to a changed beam width.

In the present exemplary embodiment described with reference to FIG. 5, the base station 510 may increase a transmission beamforming gain of the MS 520 in order to raise reception signal quality. However, depending on a communication environment, reducing the transmission beamforming gain, that is, widening the beam width, may increase the reception signal quality. In other words, a correlation between a comparison result of the signal quality and the threshold and transmission beamforming gain increase or decrease may change depending on a communication environment.

For example, the correlation may change depending on whether a radio channel of the base station 510 and the MS 520 is in a Line Of Sight (LOS) environment or in a Non-LOS (NLOS) environment. Specifically, in a case where the radio channel of the base station 510 and the MS 520 is in the LOS environment, raising a transmission beamforming gain, that is, narrowing a beam width, may increase reception intensity. On the contrary, in a case where the radio channel is in the NLOS environment, lowering the transmission beamforming gain within a predetermined range, that is, widening the beam width, may increase the reception intensity because the number of multi-paths may increase when the beam width widens. Whether the radio channel is in the LOS or the NLOS environment may be determined using an amount of change in a channel Therefore, though not shown in FIG. 5, the base station 510 may determine whether the radio channel is in the LOS or the NLOS environment by comparing an amount of change in the channel with a specific threshold, and the base station 510 may increase or reduce the transmission beamforming gain according to a correlation corresponding to the determination result.

For another example, the correlation may change according to the movement velocity of the MS 520. Specifically, in a case where the movement velocity of the MS 520 is less than a specific threshold, raising the transmission beamforming gain, that is, narrowing the beam width, may increase reception intensity. On the contrary, in a case where the movement velocity of the MS 520 is greater than the specific threshold, reducing the transmission beamforming gain within a predetermined range, that is, widening the beam width, may increase the reception intensity. The base station 510 may determine the movement velocity of the MS 520 according to position information measured or reported by the MS 520, or according to an amount of change in the channel Therefore, though not shown in FIG. 5, the base station 510 may estimate the movement velocity of the MS 520 and may compare the movement velocity with a specific threshold, and then may increase or decrease the transmission beamforming gain according to a correlation corresponding to the comparison result.

Figure 6:
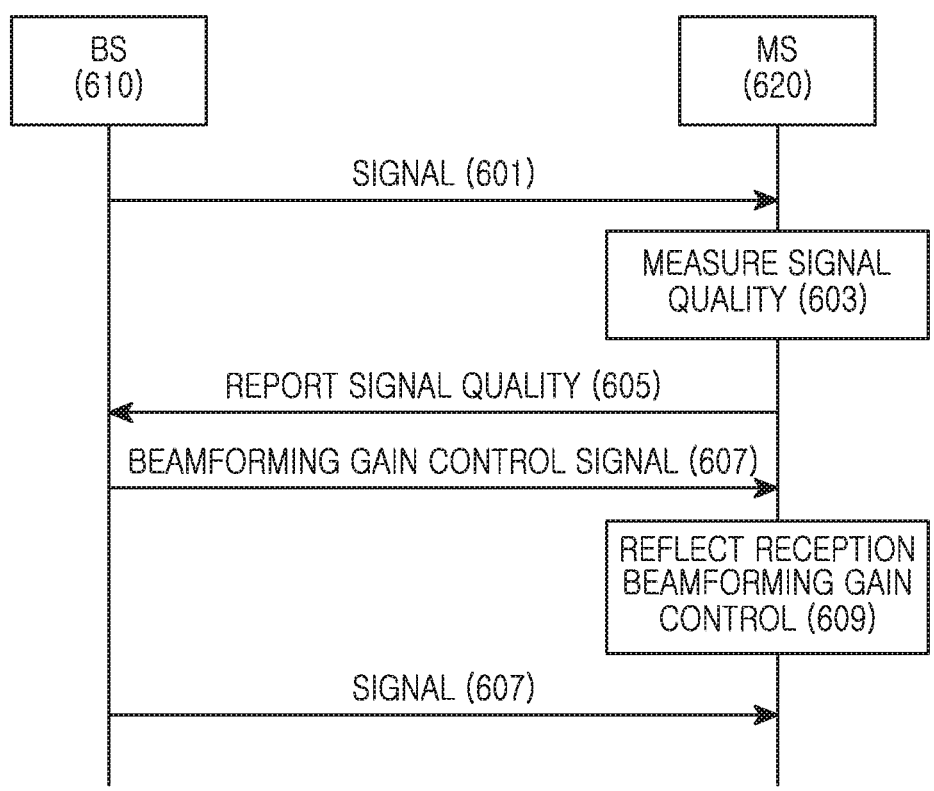
FIG. 6 illustrates a downlink reception beamforming gain control in a wireless communication system according to an exemplary embodiment of the present invention.

FIG. 6 illustrates signal exchange for a downlink reception beamforming gain control in a wireless communication system according to an exemplary embodiment of the present invention.

Referring to FIG. 6, when transmitting downlink data, a base station 610 transmits a signal, and MS 620 receives a signal using a specific beam direction and a specific reception beamforming gain value $G_{MS\_R}$. At this point, in a case where the MS 620 uses directional beamforming, the MS 620 may control the reception beamforming gain value.

In step 601, the base station 610 may transmit an RF signal to the MS 620. At this point, the reception beamforming gain of the signal is $G_{MS\_R}$. In addition, the MS 620 that has received the RF signal from the base station 610 may measure reception signal quality in step 603, and then, in step 605, the MS 620 may report the signal quality to the base station 610. The reception signal quality may be a value of a RSS, SNR, SIR, SINR, BER, PER, and any other similar and/or suitable value, or may be a deviation or a variance representing an average amount of change in the RSS, SNR, SIR, SINR, BER, PER, and the any other similar and/or suitable value. Alternatively, according to an exemplary embodiment of the present invention, the reception signal quality may be a value representing the mobility of the MS 620 and may be a movement velocity or a change value of a position of the MS 620.

The base station 610, which has received the reception signal quality, may transmit a beamforming gain control message in order to increase or reduce the reception beamforming gain in step 607. For example, in a case where the base station 610 determines that the reported reception signal quality is less than a predetermined threshold, and determines that the reception signal quality should be improved, then the base station 610 may transmit a beamforming gain control message to the MS 620 in order to increase the reception beamforming gain by a specific value+$\beta_r$. On the contrary, in a case where the base station 610 determines that the reported reception signal quality is greater than the predetermined threshold, the base station 610 may transmit a beamforming gain control message to the MS 620 in order to reduce the reception beamforming gain by a specific value–$\beta_r$. $\beta_r$ has a real number value. In a case where the gain is not controlled, or in other words, the gain is not change, $\beta_r$ may be set to '0'.

Also, in a case of controlling the beamforming gain using $\beta_r$, since the direction of a signal transmitted by the MS 620 may change, a fine direction control parameter $\alpha_r$, which is for beam direction control that is capable of more accurately controlling a beam direction determined in the original beam training, as well as a beamforming gain may be transmitted. The fine direction control parameter $\alpha_r$ may be information representing at least one of a direction and an angle, or may be an index value representing at least one of a direction and an angle prescribed between the base station 610 and the MS 620. A specific value of $\alpha_r$ may be determined as a value of a degree for controlling an error value of a beam direction generated due to beamforming gain control by $\beta_r$ without greatly changing a direction of the beam determined during the beam training process due to application of $\alpha_r$.

At this point, the base station 610 may not directly transmit $\beta_r$ and $\alpha_r$, but rather, other types of values may be used. For example, in order to control $\beta_r$ and $\alpha_r$, the base station 610 may use an index mapped to the beamforming gain and direction prescribed between the base station 610 and the MS 620 or may use an index of a precoding matrix. In other words, the base station 610 may transmit the index instead of directly transmitting $\beta_r$ and $\alpha_r$. The precoding matrix may be formed of values for controlling a magnitude and a phase of a digital signal at a digital end, or may be formed of values for controlling the magnitude and the phase of an analog signal at an end or location disposed right before an antenna.

Next, in step 607, the MS 620 may transmit a signal using a reception beamforming gain controlled according to an indication of the base station 610. That is, the reception beamforming gain is $G_{MS\_R}-\beta_r$ or $G_{MS\_R}+\beta_r$. For example, in a case of increasing the reception beamforming gain, the MS 620 may reduce the width of a reception beam. In a case of reducing the reception beamforming gain, the MS 620 may increase the width of the reception beam. In other words, the MS 620 may form a reception beam according to a changed beam width.

In the present exemplary embodiment described with reference to FIG. 6, the base station 610 may increase a reception beamforming gain of the MS 620 in order to raise reception signal quality. However, depending on a communication environment, reducing the reception beamforming gain, that is, widening the beam width, may increase the reception signal quality. In other words, a correlation between a comparison result of the signal quality and the threshold and reception beamforming gain increase or decrease may change according to a communication environment.

For example, in a case where there is more than one base station 610, which are referred to as the base stations 610, so as to provide multi-path communication, the correlation may change according to whether a radio channel of the base stations 610 and the MS 620 is in a Line Of Sight (LOS) environment or in a Non-LOS (NLOS) environment. Specifically, in a case where the radio channel of the base stations 610 and the MS 620 is in the LOS environment, raising a reception beamforming gain, that is, narrowing a beam width, may increase reception intensity. On the contrary, in a case where the radio channel is in the NLOS environment, lowering the reception beamforming gain within a predetermined range, that is, widening the beam width, may increase the reception intensity because a number of multi-paths may increase when the beam width widens. Whether the radio channel is in the LOS or the NLOS environment may be determined using an amount of change in a channel Therefore, although not shown in FIG. 9, the base stations 610 may determine whether the radio channel is in the LOS or the NLOS by comparing an amount of change in the channel with a specific threshold, and the base stations 610 may increase or reduce the reception beamforming gain according to a correlation corresponding to the determination result.

For another example, the correlation may change according to the movement velocity of the MS 620. Specifically, in a case where the movement velocity of the MS 620 is less than the specific threshold, raising the reception beamforming gain, that is, narrowing the beam width, may increase reception intensity. On the contrary, in a case where the movement velocity of the MS 620 is greater than the specific threshold, reducing the reception beamforming gain within a predetermined range, that is, widening the beam width, may increase the reception intensity. The base stations 610 may determine the movement velocity of the MS 620 according to position information measured or reported by the MS 620, or according to an amount of change in the channel Therefore, although not shown in FIG. 9, the base stations 610 may estimate the movement velocity of the MS 620 and may compare the movement velocity with a specific threshold, and then, the base stations 610 may increase and/or decrease the reception beamforming gain according to a correlation corresponding to the comparison result.

In the exemplary embodiments of the present invention described with reference to FIGS. 5 and 6, an increase or decrease amount of a beamforming gain, and a beamforming gain value, are directly expressed in unit of dB. However, the present invention is not limited thereto, and the increase or decrease amount of the beamforming gain, and the beamforming gain value, may be expressed using a beam width.

Also, in the exemplary embodiments of the present invention described with reference to FIGS. 5 and 6, the base station 510/610 may determine whether to control a beamforming gain. However, the present invention is not limited thereto, and the MS 520/620 may determine whether to control a beamforming gain. In such a case, the MS 520/620 may compare reception signal quality with a threshold and may determine whether to control the beamforming gain according to the comparison result. In the case where the beamforming gain control is determined, the MS 520/620 may control the beamforming gain of the MS 520/620 or may request the base station 510/610 in order to control the beamforming gain of the base station 510/610.

Also, in the exemplary embodiments of the present invention described with reference to FIGS. 5 and 6, the base station 510/610 may request the MS 520/620 to control the beamforming gain. However, according to another exemplary embodiment of the present invention, the base station 510/610 may not request the MS to control the beamforming gain but, rather, control the beamforming gain of the base station 510/610.

Also, in the exemplary embodiments of the present invention described with reference to FIGS. 5 and 6, the base station 510/610 may determine whether to control the beamforming gain using signal quality. However, according to another exemplary embodiment of the present invention, the base station 510/610 may estimate a mobility of the MS 520/620, and may determine whether to control the beamforming gain depending according to the mobility of the MS 520/620. For example, the mobility may be estimated via a change degree of signal quality or may be estimated via a position estimation of the MS 520/620. For example, the position estimation may be determined via a Global Positioning System (GPS). That is, in a case where the mobility is large, the beamforming gain control, which in this case may be a beam width reduction, may hinder reception power improvement. Therefore, in the case where the mobility is large, the base station 510/610 may determine to not control the beamforming gain.

Figure 7:
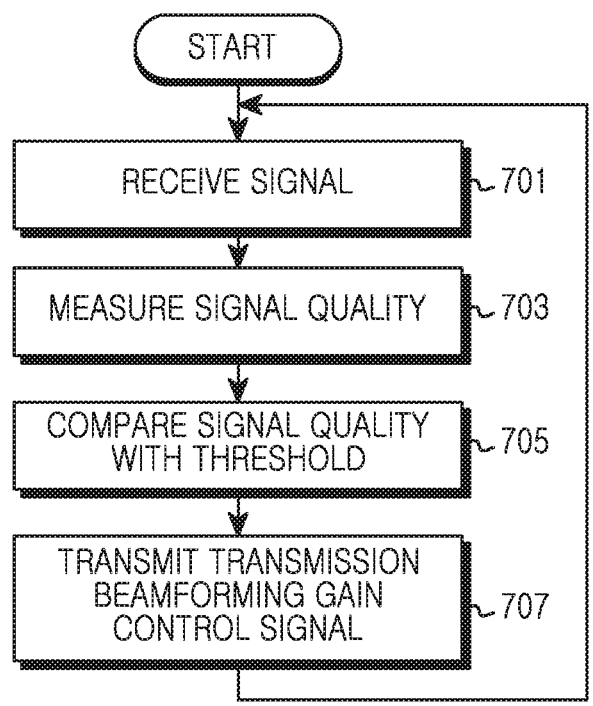
FIG. 7 illustrates an operating procedure of a Base Station (BS), for controlling a transmission beamforming gain of a Mobile Station (MS) in a wireless communication system according to an exemplary embodiment of the present invention.

FIG. 7 illustrates an operating procedure of a base station, for controlling a transmission beamforming gain of MS in a wireless communication system according to an exemplary embodiment of the present invention.

Referring to FIG. 7, the base station receives a signal, such as an RF signal, from an MS via a radio channel in step 701. Here, the MS transmits a signal having directionality via beamforming. When receiving the signal from the MS, the base station may perform reception beamforming.

After receiving the signal, the base station proceeds to step 703 in order to measure a signal quality of the signal sent by the MS. For example, the signal may be one of a traffic signal for data transfer, a control signal for control information transfer, a sounding signal for channel estimation, a pilot signal, or any other similar and/or suitable signal transmitted from an MS to a BS. The signal quality may be any of the signal quality values discussed with reference to FIGS. 5 and 6.

Subsequently, the base station proceeds to step 705 and may compare the measured signal quality with a threshold. Here, the threshold may be one value or a plurality of values and represents an objective, or predetermined, reception signal quality. After performing the comparison, the base station proceeds to step 707 in order to transmit a control signal for a transmission beamforming gain of the MS according to the result of the comparison with the at least one threshold. In other words, the base station may transmit a control message indicating an increase or decrease of the transmission beamforming gain. Correlation between the comparison result and increase or decrease of the transmission beamforming gain may change according to a signal quality value that is in use, or other similar factors.

According to an exemplary embodiment of the present invention, in a case where the measured signal quality is less than the threshold, the base station may transmit a control message in order to increase the transmission beamforming gain of the MS by a specific value+$\beta_t$. On the contrary, the measured signal quality may be equal to or greater than the threshold, and the base station may transmit a control message in order to reduce the transmission beamforming gain of the MS by a specific value–$\beta_t$ or may transmit a control message in order to maintain the transmission beamforming gain of the MS. For example, in the case where the measured signal quality is greater than the threshold and greater than the other threshold, then the base station may transmit a control message in order to reduce the transmission beamforming gain. In a case where the measured signal quality is greater than the threshold but less than the other threshold, then the base station may transmit a control message in order to maintain the transmission beamforming gain.

According to another exemplary embodiment of the present invention, in a case where the measured signal quality is less than the threshold, then the base station may transmits a control message in order to reduce the transmission beamforming gain of the MS by a specific value–$\beta_t$. In addition, in a case where the measured signal quality is equal to or greater than the threshold, then the base station may transmit a control message in order to increase the transmission beamforming gain of the MS by a specific value+$\beta_t$ or in order to maintain the transmission beamforming gain. For example, in a case where the measured signal quality is greater than the threshold and greater than the other threshold, the base station may transmit a control message in order to increase the transmission beamforming gain. In a case where the measured signal quality is greater than the threshold but less than the other threshold, the base station may transmit a control message in order to maintain the transmission beamforming gain.

As described above, the correlation between a comparison result of the signal quality and the threshold and transmission beamforming gain increase or decrease may change. Accordingly, in order to determine whether to control the transmission beamforming gain according to the correlation, the base station may further determine whether a radio channel with the MS is in a LOS environment or whether the movement velocity of the MS exceeds a specific threshold.

In the above exemplary embodiments, in the cases of an increase, a decrease, and maintenance or not changing of the transmission beamforming gain, a control message is transmitted. However, according to another exemplary embodiment of the present invention, the base station may transmit the control message only in case of increasing the transmission beamforming gain, without consideration of reduction or maintenance of the transmission beamforming gain. That is, the transmission beamforming gain control of the MS may be performed only in order to increase the gain. Also, in addition to a parameter indicating an increase or decrease of the gain, the control message may further include at least one of a fine direction control parameter $\alpha_t$ for controlling a beam direction and an amount of change in a transmission power value $\Delta P$.

Figure 8:
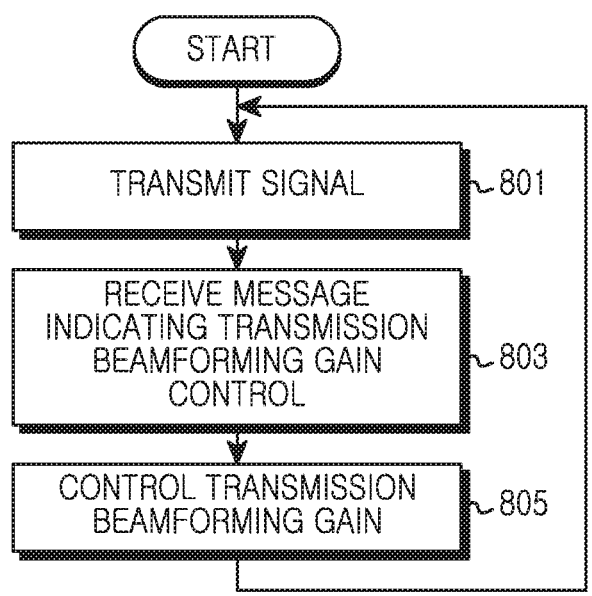
FIG. 8 illustrates an operating procedure of an MS, for controlling a transmission beamforming gain of the MS in a wireless communication system according to an exemplary embodiment of the present invention.

FIG. 8 illustrates an operating procedure, of an MS, for controlling a transmission beamforming gain of the MS in a wireless communication system according to an exemplary embodiment of the present invention.

Referring to FIG. 8, the MS may transmit a signal, such as an RF signal, to a base station via a radio channel in step 801. For example, the signal may be one of a traffic signal for data transfer, a control signal for control information transfer, a sounding signal for channel estimation, a pilot signal, and any other similar and/or suitable signal that may be sent from the MS to the BS.

After that, the MS proceeds to step 803 in order to receive, from the base station, a control message indicating transmission beamforming gain control. The control message may indicate an increase, a decrease, or a maintaining of the transmission beamforming gain. In the case of indicating an increase or a decrease of the transmission beamforming gain, the control message may include at least one of an amount of increase, an amount of decrease, and a gain value after an increase or decrease. In the case of indicating the maintaining of the transmission beamforming gain, the control message may include at least one of the amount of increase or decrease being set to '0', and information indicating that there is no change to the transmission beamforming gain. According to another exemplary embodiment of the present invention, in the case of indicating the maintaining of the transmission beamforming gain, the control message may not be received.

Subsequently, the MS proceeds to step 805 in order to control the transmission beamforming gain according to the indication of the control message. For example, in the case where the control message includes control information for increasing the transmission beamforming gain of the MS by a specific value+$\beta_t$, the MS may control the gain of the transmission beamforming using a value obtained by adding +$\beta_t$ to a current transmission beamforming gain. On the contrary, in the case where the control message includes control information for reducing the transmission beamforming gain of the MS by a specific value–$\beta_t$, then the MS may control the gain of the transmission beamforming using a value obtained by subtracting $\beta_t$ from the current transmission beamforming gain of the MS. Also, in the case where the control message is not received or a maintaining of the current transmission beamforming gain is indicated, the MS may continue to maintain the current transmission beamforming gain of the MS.

In addition to a parameter indicating an increase or decrease of the transmission beamforming gain, the control message may further include at least one of a fine direction control parameter $\alpha_t$ for controlling a beam direction and an amount of change in a transmission power value $\Delta P$. In this case, the MS may further control the beam direction and the power value.

Figure 9:
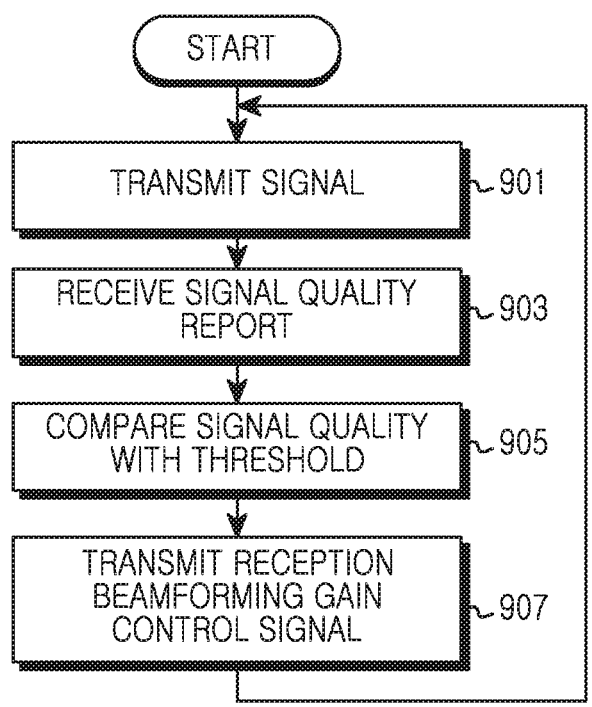
FIG. 9 illustrates an operating procedure of a BS, for controlling a reception beamforming gain of an MS in a wireless communication system according to an exemplary embodiment of the present invention.

FIG. 9 illustrates an operating procedure, of a base station, for controlling a reception beamforming gain of an MS in a wireless communication system according to an exemplary embodiment of the present invention.

Referring to FIG. 9, the base station may transmit a signal, such as an RF signal, to the MS via a radio channel in step 901. For example, the signal may be one of a traffic signal for data transfer, a control signal for control information transfer, a pilot signal for channel estimation, a synchronization signal for obtaining synchronization, and any other signal that may be transmitted from a base station to an MS.

After that, the base station proceeds to step 903 in order to receive a report of signal quality measured by the MS with respect to the signal. For example, the signal quality report may be received via a feedback channel allocated by the base station, any the signal quality may include at least one of RSS, SNR, SIR, SINR, BER, and PER, or may include at least one of a deviation and a variance representing an average amount of change of the RSS, SNR, SIR, SINR, BER, and PER. Alternatively, according to another exemplary embodiment of the present invention, the reception signal quality may be a value representing the mobility of the MS and may be a movement velocity or a change value of a position of the MS.

Next, the base station proceeds to step 905 in order to compare the reported signal quality with a threshold. Here, the threshold may be one value or a plurality of values. The threshold represents object reception signal quality.

After performing the comparison in step 905, the base station proceeds to step 907 in order to transmit a control signal for the reception beamforming gain of the MS according to a result of comparison of the signal quality with the at least one threshold. In other words, the base station may transmit a control message indicating an increase or decrease of the reception beamforming gain. Correlation between the comparison result and the increase or decrease of the reception beamforming gain may change according to a specific exemplary embodiment. For example, the correlation may depend on what type of signal quality measurement is in use.

According to an exemplary embodiment of the present invention, in a case where the measured signal quality is less than the threshold, the base station may transmit a control message in order to increase a reception beamforming gain of the MS by a specific value+$\beta_r$. On the contrary, in a case where the measured signal quality is equal to or greater than the threshold, the base station may transmit a control message in order to reduce the reception beamforming gain of the MS by a specific value–$\beta_r$, or may transmit a control message in order to maintain, i.e., not change, the reception beamforming gain of the MS. For example, in a case where the measured signal quality is greater than the threshold and greater than another threshold, the base station may transmit a control message in order to reduce the reception beamforming gain. In a case where the measured signal quality is greater than the threshold but less than another threshold, the base station may transmit a control message in order to maintain the reception beamforming gain.

According to another exemplary embodiment of the present invention, in a case where the measured signal quality is less than the threshold, the base station may transmit a control message ordering to reduce the reception beamforming gain of the MS by a specific value–$\beta_r$. In addition, in a case where the measured signal quality is equal to or greater than the threshold, the base station may transmit a control message in order to increase the reception beamforming gain of the MS by a specific value+$\beta_r$, or in order to maintain the reception beamforming gain of the MS. For example, in a case where the measured signal quality is greater than the threshold and greater than another threshold, the base station may transmit a control message in order to increase the reception beamforming gain. In a case where the measured signal quality is greater than the threshold but less than another threshold, the base station may transmit a control message in order to maintain the reception beamforming gain.

As described above, the correlation between a comparison result of the signal quality and the threshold and the reception beamforming gain increase or decrease may change. Accordingly, in order to determine whether to control the reception beamforming gain according to the correlation, the base station may further determine whether a radio channel with the MS is in a LOS environment or whether the movement velocity of the MS exceeds a specific threshold.

In the above exemplary embodiments, in the cases of an increase, a decrease, and maintenance of the reception beamforming gain, a control message is transmitted. However, according to another exemplary embodiment of the present invention, the base station may transmit the control message only in case of increasing the reception beamforming gain without consideration of decreasing or maintaining the reception beamforming gain. That is, according to an exemplary embodiment, the reception beamforming gain control of the MS may be performed only in order to increase the gain. Also, in addition to a parameter indicating an increase or decrease of the reception beamforming gain, the control message may further include at least one of a fine direction control parameter $\alpha_r$ for controlling a beam direction.

Figure 10:
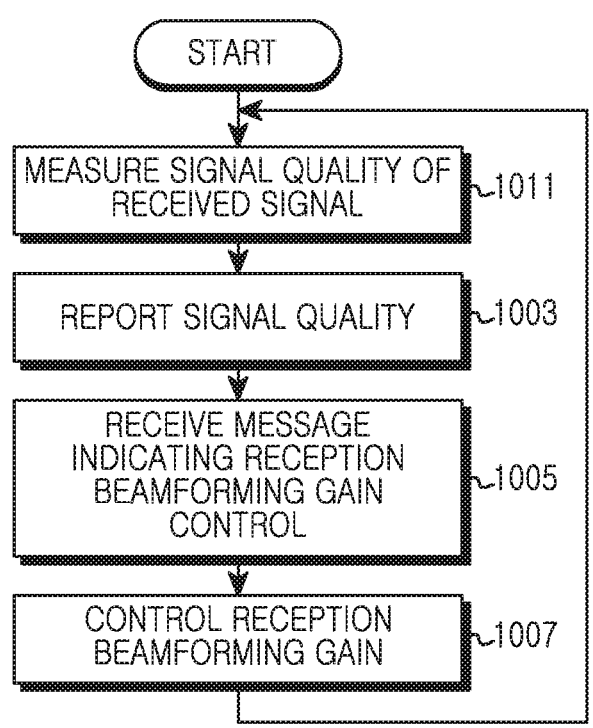
FIG. 10 illustrates an operating procedure of an MS, for controlling a reception beamforming gain of the MS in a wireless communication system according to an exemplary embodiment of the present invention.

FIG. 10 illustrates an operating procedure, of an MS, for controlling a reception beamforming gain of the MS in a wireless communication system according to an exemplary embodiment of the present invention.

Referring to FIG. 10, the MS may receive a signal, such as an RF signal, from a base station via a radio channel and may measure signal quality of the received signal in step 1001. For example, the signal may be one of a traffic signal for data transfer, a control signal for control information transfer, a sounding signal for channel estimation, a pilot signal or any other similar and/or suitable signal that may be transmitted from a base station to an MS.

Subsequently, the MS proceeds to step 1003 in order to transmit a report of the measured signal quality to the base station. For example, the report of the signal quality may be transmitted via a feedback channel allocated by the base station, and the signal quality may include at least one of RSS, SNR, SIR, SINR, BER, and PER, or may include at least one of a deviation and a variance representing an average amount of change of the RSS, SNR, SIR, SINR, BER, and PER. Alternatively, according to another exemplary embodiment of the present invention, the reception signal quality may be a value representing the mobility of the MS and may be a movement velocity or a change value of a position of the MS.

After that, the MS proceeds to step 1005 in order to receive, from the base station, a control message for controlling the reception beamforming gain. The control message may indicate an increase, a decrease, or a maintaining of the reception beamforming gain. In the case where the control message indicates an increase or a decrease of the reception beamforming gain, the control message may include at least one of an amount of increase, an amount of decrease, and a gain value after increase or decrease. In the case where the control message indicates the maintaining of the reception beamforming gain, the control message may include at least one of an amount of increase or an amount of decrease as being set to '0' and information indicating the maintaining of the reception beamforming gain. According to another exemplary embodiment of the present invention, in a case where the control message indicates maintaining of the reception beamforming gain, the control message may be not transmitted and/or not received.

Next, the MS proceeds to step 1007 in order to control the reception beamforming gain according to the indication of the control message. For example, in a case where the control message includes control information for increasing the reception beamforming gain of the MS by a specific value+$\beta_r$, then the MS may control the gain of the reception beamforming using a value obtained by adding +$\beta_r$ to the current reception beamforming gain. On the contrary, in a case where the control message includes control information for reducing the reception beamforming gain of the MS by a specific value–$\beta_r$, then the MS may control the gain of the reception beamforming using a value obtained by subtracting $\beta_r$ from the current reception beamforming gain of the MS. Also, in a case where the control message is not received or maintaining of the current reception beamforming gain is indicated, then the MS may continue to maintain the current reception beamforming gain of the MS.

In addition to a parameter indicating an increase or decrease of the reception beamforming gain, the control message may further include a fine direction control parameter $\alpha_r$ for controlling a beam direction. In this case, the MS may further control the beam direction.

Figure 11:
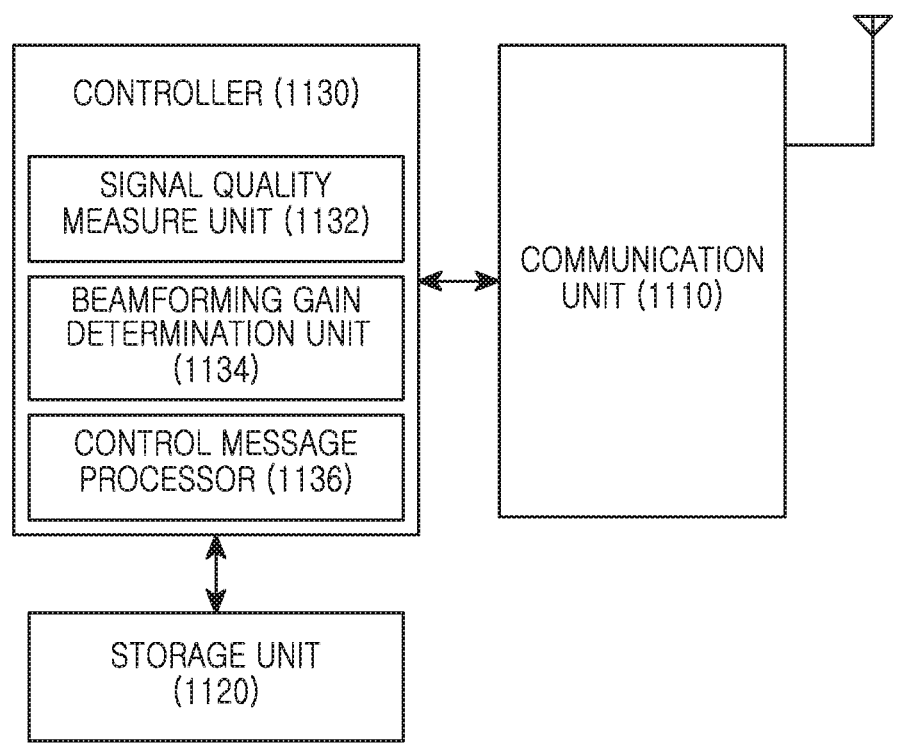
FIG. 11 illustrates a BS in a wireless communication system according to an exemplary embodiment of the present invention.

FIG. 11 is a block diagram illustrating a base station in a wireless communication system according to an exemplary embodiment of the present invention.

Referring to FIG. 11, the base station may include a communication unit 1110, a storage unit 1120, and a controller 1130. The communication unit 1110 may transmit and/or receive a signal, such as an RF signal, via a radio channel. For example, the communication unit 1110 may include a digital block (not shown) and an RF block (not shown). The digital block may include an encoder, a decoder, a Digital-to-Analog Convert (DAC), and other similar and/or suitable elements for signal communication. The RF block may include an amplifier, a mixer, an oscillator, and other similar and/or suitable elements for signal communication. Also, according to an exemplary embodiment of the present invention, the communication unit 1110 may include an element for transmission beamforming and an element for reception beamforming. The element for beamforming is described in detail with reference to FIGS. 13A to 13C. The storage unit 1120 may store at least one program used for operating the base station, as well as setting information, and other similar and/or suitable information stored for operation of the base station.

The controller 1130 may control overall functions of the base station. For example, the controller 1130 may perform a beam training procedure. Also, the controller 1130 may control the communication unit 1110 in order to perform beamforming according to a beam index determined via the beam training procedure. Particularly, according to an exemplary embodiment of the present invention, the controller 1130 may perform a beamforming gain control procedure, and may control the communication unit 1110 in order to control a beamforming gain according to a gain value determined via the beamforming gain control procedure. For the beamforming gain control procedure, the controller 1130 may include a signal quality measure unit 1132 for measuring signal quality of an uplink signal, a beamforming gain determination unit 1134 for determining whether to control a beamforming gain and an amount of change of the beamforming gain, and a control message processor 1136 for generating a control message for informing the determined amount of change. The operation of the controller 1130, for the beamforming gain control procedure is described below in detail.

In a case of an uplink beamforming gain control, the controller 1130 may measure signal quality of an uplink signal received from the MS via a radio channel, and may compare the measured signal quality with a threshold. Also, in a case of a downlink beamforming gain control, the controller 1130 may transmit a signal to the MS using the radio channel via the communication unit 1110, and may then receive a report on a signal quality measured by the MS with respect to the signal. Subsequently, the controller 1130 may compare the reported signal quality with a threshold. In addition, the controller 1130 may determine an increase or decrease of the transmission beamforming gain of the MS according to the comparison result of the signal quality and the threshold, and may transmit the control message indicating the increase or decrease of the transmission beamforming gain via the communication unit 1110.

A correlation between the comparison result and the increase or decrease of the transmission and/or reception beamforming gain may change according to a specific exemplary embodiment. According to an exemplary embodiment of the present invention, in a case where the measured signal quality is less than the threshold, the controller 1130 may determine to increase the transmission and/or reception beamforming gain of the MS by a specific value+$\beta_r$. In a case where the measured signal quality is equal to or greater than the threshold, the controller 1130 determines to reduce the transmission and/or reception beamforming gain of the MS by a specific value–$\beta_r$, or may determine to maintain the transmission and/or reception beamforming gain of the MS. According to an exemplary embodiment of the present invention, in a case where the measured signal quality is less than the threshold, the controller 1130 may determine to reduce the transmission and/or reception beamforming gain of the MS by a specific value–$\beta_r$. In a case where the measured signal quality is equal to or greater than the threshold, the controller 1130 may determine to increase the transmission and/or reception beamforming gain of the MS by a specific value+$\beta_r$, or may determine to maintain the transmission and/or reception beamforming gain of the MS.

Also, in order to determine whether to control the transmission and/or reception beamforming gain according to the correlation, the controller 1130 may further determine whether a radio channel with the MS is in a LOS environment or whether the movement velocity of the MS exceeds a specific threshold.

In the above exemplary embodiments, in cases of an increase, a decrease, and maintenance of the transmission and/or reception beamforming gain, a control message is transmitted. However, according to another exemplary embodiment of the present invention, the controller 1130 may transmit the control message only in a case of increasing the transmission beamforming gain without consideration of reducing or maintaining the transmission beamforming gain. In other words, in the case where the reported signal quality is equal to or greater than the threshold, the controller 1130 may not transmit the control message.

Figure 12:
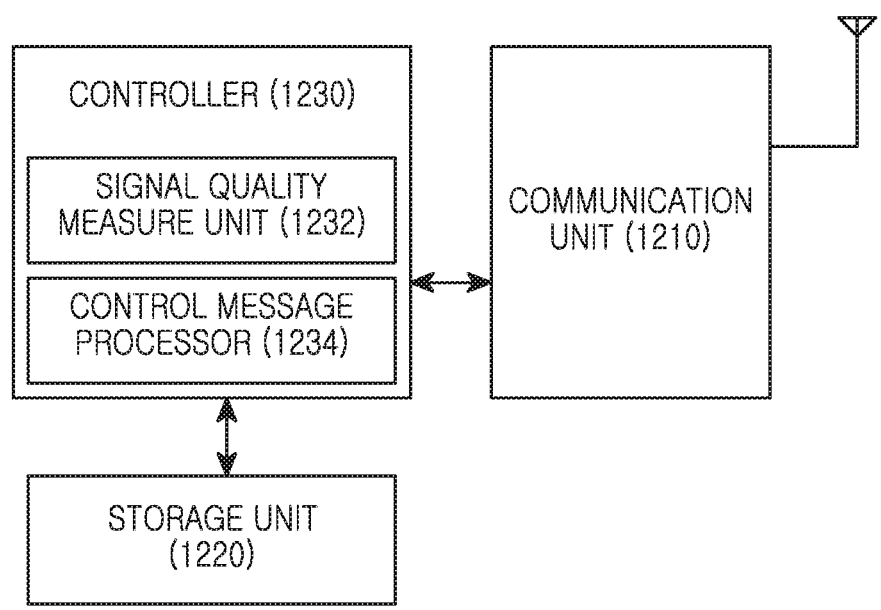
FIG. 12 illustrates an MS in a wireless communication system according to an exemplary embodiment of the present invention.

FIG. 12 is a block diagram illustrating an MS in a wireless communication system according to an exemplary embodiment of the present invention.

Referring to FIG. 12, the MS includes a communication unit 1210, a storage unit 1220, and a controller 1230. The communication unit 1210 may transmit and/or receive a signal via a radio channel. For example, the communication unit 1210 may include a digital block (not shown) and an RF block (not shown). The digital block may include an encoder, a decoder, a DAC, and other similar and/or suitable elements for signal communications. The RF block may include an amplifier, a mixer, an oscillator, and other similar and/or suitable elements for signal communications. Also, according to an exemplary embodiment of the present invention, the communication unit 1210 may include an element for transmission beamforming and an element for reception beamforming. The element for beamforming is described in detail with reference to FIGS. 13A to 13C. The storage unit 1220 may store at least one program used for operating the MS, as well as setting information, and any other similar and/or suitable information used for operating the MS.

The controller 1230 may control overall functions of the MS. For example, the controller 1230 may perform a beam training procedure. Also, the controller 1230 may control the communication unit 1210 in order to perform beamforming according to a beam index determined via the beam training procedure. Particularly, according to an exemplary embodiment of the present invention, the controller 1230 may perform a beamforming gain control procedure, and may control the communication unit 1210 in order to control a beamforming gain according to a gain value determined via the beamforming gain control procedure. Furthermore, the controller 1230 may include a signal quality measure unit 1232 for measuring signal quality of a downlink signal, and a control message processor 1234 for determining whether a beamforming gain changes or an amount of change of the beamforming gain by analyzing a control message received from the base station. An operation of the controller 1230, for the beamforming gain control procedure, is described below in detail.

In a case of an uplink beamforming gain control, the controller 1230 may transmit a signal to the base station using a radio channel via the communication unit 1210, and then may receive a control message for controlling transmission beamforming gain from the base station. Subsequently, the controller 1230 may control the transmission beamforming gain according to indication of the control message. For example, in a case where the control message includes control information for increasing the transmission beamforming gain of the MS by +$\beta_t$, the controller 1230 may control the gain of the transmission beamforming using a value obtained by adding +$\beta_t$ to the current transmission beamforming gain. On the contrary, in a case where the control message includes control information for reducing the transmission beamforming gain of the MS by a specific value–$\beta_t$, the controller 1230 may control the gain of the transmission beamforming using a value obtained by subtracting $\beta_t$ from the current transmission beamforming gain of the MS. Also, in a case where the control message is not received or maintaining of the current transmission beamforming gain is indicated, the controller 1230 may continue to maintain the current transmission beamforming gain of the MS.

In a case of a downlink beamforming gain control, the controller 1230 may receive a signal from the base station via a radio channel, may measure signal quality of the received signal, and may then transmits a report of the measured signal quality to the base station via the communication unit 1210. After that, the controller 1230 may receive a control message for controlling a reception beamforming from the base station. In addition, the controller 1230 may control the reception beamforming gain according to the indication of the control message. For example, in a case where the control message includes control information for increasing the reception beamforming gain of the MS by +$\beta_t$, the controller 1230 may control the gain of the reception beamforming using a value obtained by adding +$\beta_t$ to the current reception beamforming gain. On the contrary, in a case where the control message includes control information for reducing the reception beamforming gain of the MS by a specific value–$\beta_t$, the controller 1230 may control the gain of the reception beamforming using a value obtained by subtracting $\beta_t$ from the current reception beamforming gain of the MS. Also, in a case where the control message is not received or maintaining of the current reception beamforming gain is indicated, the controller 1230 may continue to maintain the current reception beamforming gain of the MS.

In a case where the MS uses a beamforming technique in order to control the gain of the transmission and reception beamforming, the construction of the transceiver for an RF signal and beamforming are described in detail with reference to FIGS. 13A to 13C.

Figure 13A:
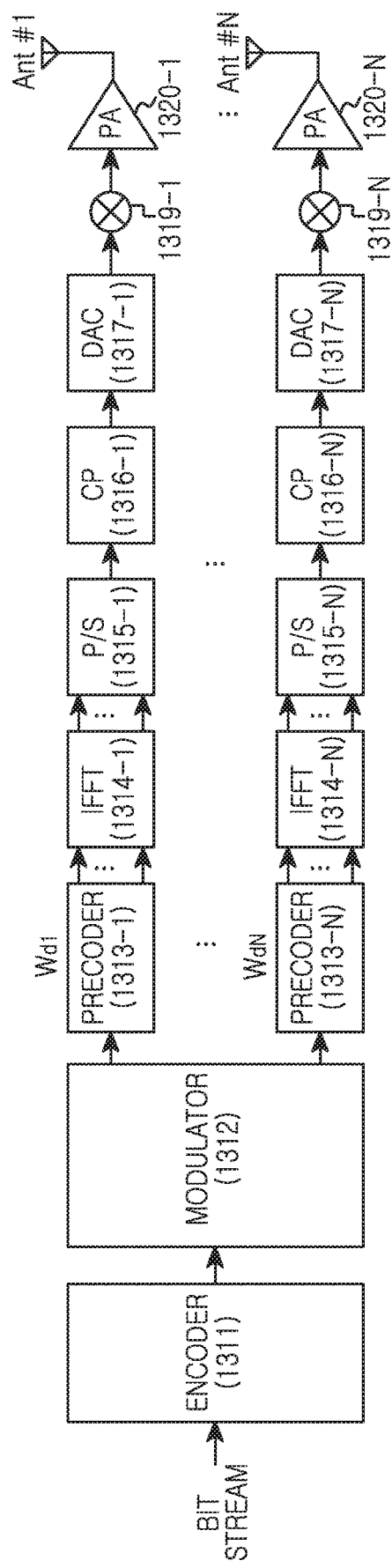
FIGS. 13A to 13C illustrate a beamforming apparatus according to a beamforming method in a wireless communication system according to an exemplary embodiment of the present invention.
Figure 13B:
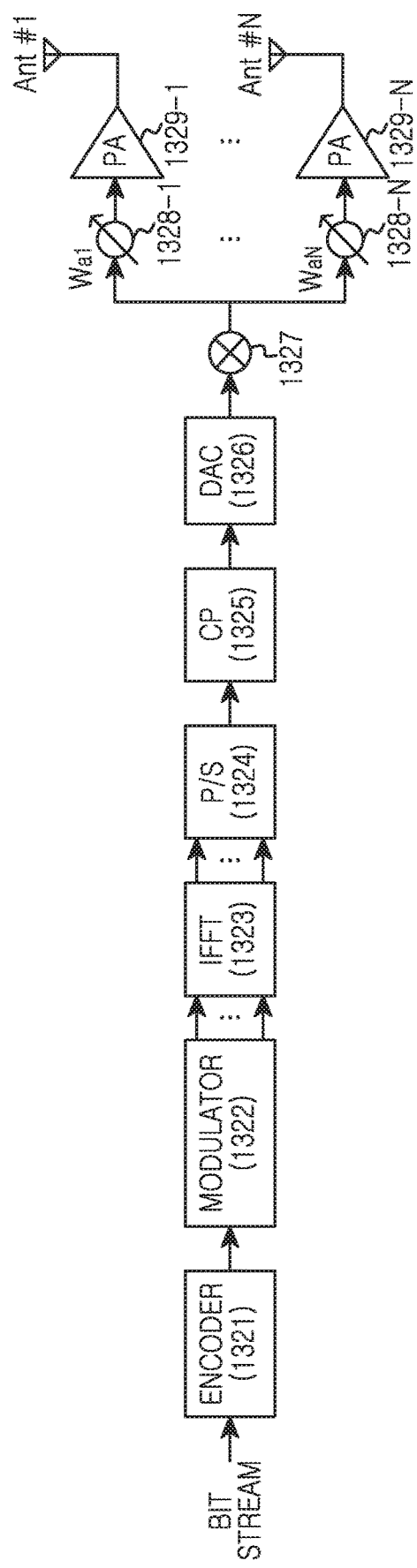
Figure 13C:
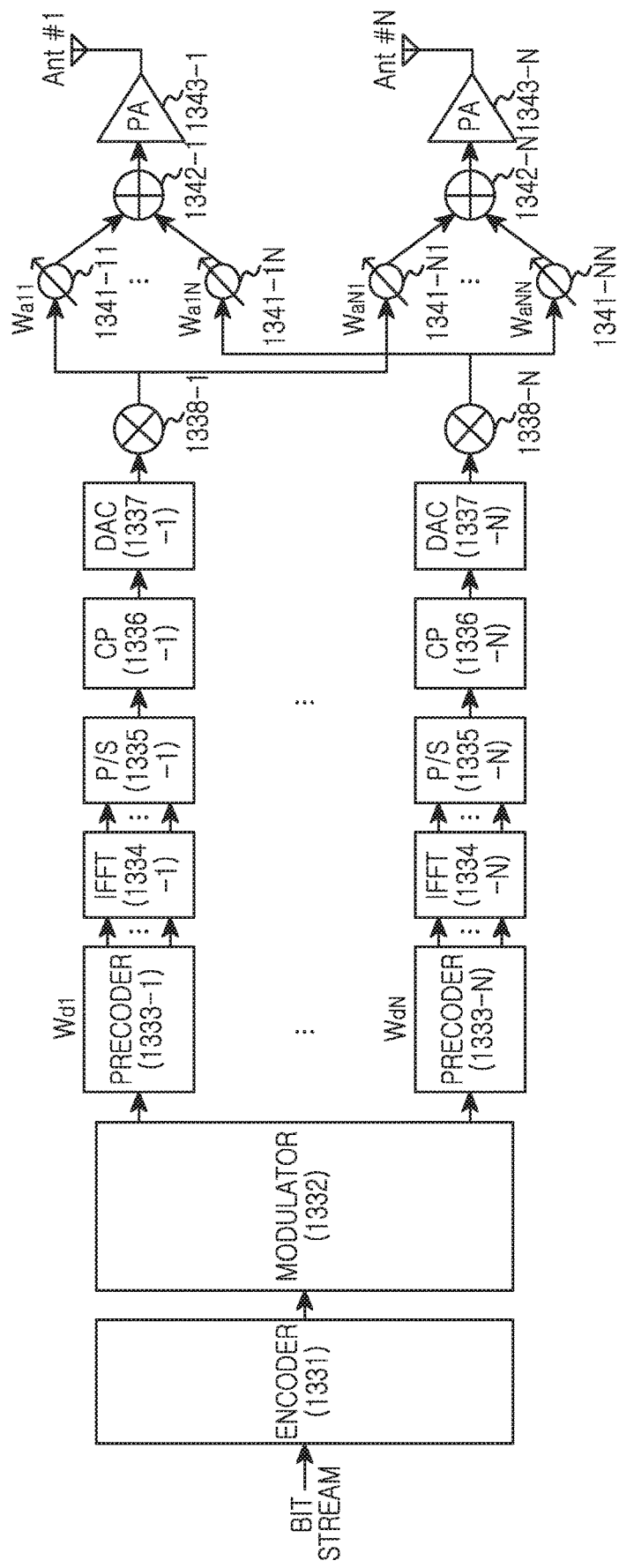

FIGS. 13A to 13C are block diagrams illustrating a beamforming apparatus according to a beamforming method in a wireless communication system according to an exemplary embodiment of the present invention.

Beamforming may be classified into digital beamforming and analog beamforming according to a point at which the beamforming is performed. The digital beamforming and the analog beamforming differ according to whether a beamforming parameter for determining a beam direction is determined before a Digital-to-Analog Converter (DAC) or after the DAC. In a case of the digital beamforming, the beamforming parameter may be multiplied by a bit stream before the DAC. On the contrary, in a case of the analog beamforming, the beamforming parameter controls a magnitude and a phase of each signal to be transmitted via each antenna after the DAC. Also, in a case where both the digital beamforming and the analog beamforming are performed, mixed beamforming is also possible.

FIG. 13A illustrates a block diagram of an apparatus for performing digital beamforming Referring to FIG. 13A, an information bit stream may be converted into a complex symbol stream via an encoder 1311 and a modulator 1312. The bit stream may be successive information values having a value of '0' or '1', and the bit stream may be one or more bit streams input to each independent path. In a case where an independent bit stream is transmitted for each antenna, complex symbols may be multiplexed and provided to each path. In a case where the same bit stream is transmitted from all antennas, the same complex symbols may be provided to all paths. The complex symbols may be multiplied by beamforming parameters Wd1, . . . , WdN by precoders 1313-1 to 1313-N of each path, and then converted to Orthogonal Frequency Division Multiplexing (OFDM) symbols via Inverse Fast Fourier Transform (IFFT) operators 1314-1 to 1314-N, Parallel to Serial (P/S) converters 1315-1 to 1315-N, and Cyclic Prefix (CP) insertion units 1316-1 to 1316-N. After that, the OFDM symbols, which are digital signals, may be converted to analog signals by DACs 1317-1 to 1317-N. After that, analog signals of respective paths may be converted to RF signals by mixers 1319-1 to 1319-N, and amplified via Power Amplifiers (PAs) 1320-1 to 1320-N, and then transmitted via respective ones on N antennas. As described above, in a case of the digital beamforming, the DAC 1319 is provided for each antenna, and a beamforming parameter is multiplied by a complex symbol before the DAC 1319. Therefore, in a case where the number of antennas are N, the beamforming parameters of the digital beamforming become Wd1, . . . , WdN, and each factor of the parameter is also a complex number. Also, in a case where a plurality of antenna groups form one antenna, a Multiple Input Multiple Output (MIMO) technique may be applied. In this case, beamforming parameters of Wd1, . . . , WdN are defined for each antenna group, and each factor of the beamforming parameter becomes a matrix or a vector value formed of complex numbers. In a case where the MIMO technique is applied, besides the precoders 1313-1 to 1313-N for the beamforming, a precoder block for the MIMO technique may exist independently from the beamforming precode blocks 1313-1 to 1313-N.

FIG. 13B illustrates a block diagram of an apparatus for performing analog beamforming Referring to FIG. 13B, an information bit stream may be converted to complex symbols via an encoder 1321 and a modulator 1322. The bit stream may be successive information values having a value of '0' or '1'. The complex symbols may be converted to OFDM symbols via IFFT operator 1323, P/S converter 1324, and CP insert unit 1325. After that, the OFDM symbols, which are digital signals, may be converted to analog signals by a DAC 1326, and converted to RF signals via a mixer 1327. The RF signal may be input to a path of each antenna, then its magnitude and phase are changed by phase/magnitude converters 1328-1 to 1328-N, then the RF signal is amplified via PAs 1329-1 to 1329-N, and then transmitted via each of N antennas. As described above, the analog beamforming may determine the direction of a beam to be transmitted at each antenna by channel-coding, modulating, and analog-converting an information bit stream, and then changing the magnitude or phase of the analog signal before the signal is transmitted at the antenna. For example, in a case where beamforming parameters for each antenna are Wa1, . . . , WaN, each factor of the beamforming parameter includes at least one of a magnitude value and a phase value of a signal for each antenna. The analog beamforming may change the magnitude value and the phase value simultaneously, or control only the phase value. Also, in a case where a plurality of antenna groups forms one antenna, the MIMO technique may be applied. In this case, beamforming parameters of Wa1, . . . , WaN are defined for each antenna group, and each factor of the beamforming parameter becomes a matrix or a vector value formed of at least one of the magnitude or the phase value of a signal for each antenna group.

FIG. 13C illustrates a block diagram of an apparatus for performing mixed beamforming Referring to FIG. 13C, an information bit stream may be converted into complex symbols via an encoder 1331 and a modulator 1332. The bit stream may be successive information values having a value of '0' or '1', and the bit stream may be one or more bit streams input to each independent path. Similarly to FIG. 13A, the complex symbols may be multiplied by beamforming parameters Wd1, . . . , WdN by precoders 1333-1 to 1333-N of each path, and then converted to OFDM symbols via IFFT operators 1334-1 to 1334-N, P/S converters 1335-1 to 1335-N, and CP insertion units 1336-1 to 1336-N. After that, the OFDM symbols, which are digital signals, may be converted to analog signals by DAC 1337-1 to 1337-N, and then the analog signals are converted to RF signals by mixers 1338-1 to 1338-N. After that, similarly to FIG. 13B, the magnitude and phase of digital beamformed signals of each path may be changed by phase/magnitude converters 1341-11 to 1341-N, . . . , and 1341-N1 to 1341-NN of respective antenna paths, and signals to be transmitted via the same antenna are summed by summing units 1342-1 to 1342-N. The summed signals may be amplified via power amplifiers 1343-1 to 1343-N of respective antenna paths, and then transmitted via each of N antennas. As described above, mixed beamforming includes both the digital beamforming and the analog beamforming. In this case, the beamforming parameter includes Wd1, . . . , WdN for the digital beamforming, and Wa1, . . . , WaN for the analog beamforming. The two kinds of beamforming parameters control beamforming independently or using a specific relation equation.

FIGS. 13A to 13C illustrate a block diagram for transmission beamforming. In a case of reception beamforming, the DAC is replaced by an Analog-to-Digital Converter (ADC), the precoder is replaced by a post-coder, the encoder is replaced by a decoder, the modulation is replaced by demodulation, and the direction of the amplifier and the movement direction of a signal are changed to be in an opposite direction. In a case of a non-OFDM system, the IFFT operators, the P/S converters, and the CP insert units of the above-described blocks may be omitted.

Figure 14:
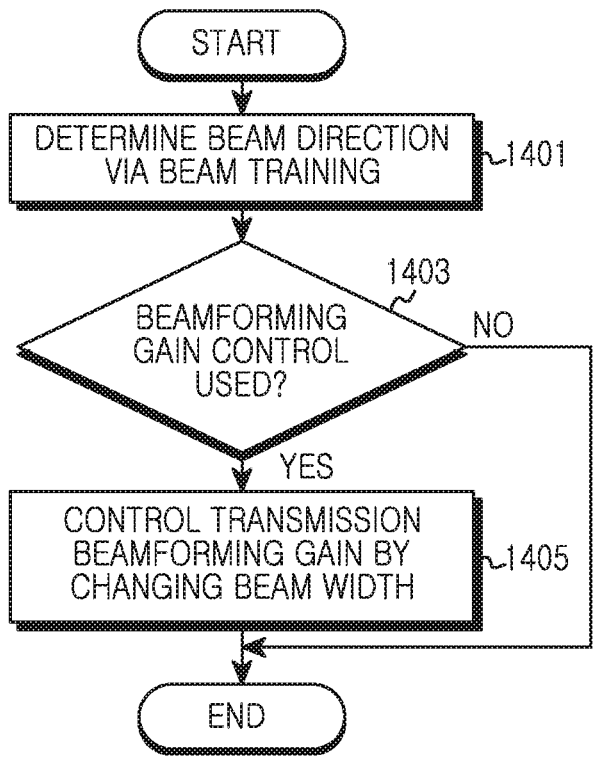
FIG. 14 illustrates an operating procedure of a communication node in a wireless communication system according to an exemplary embodiment of the present invention.

FIG. 14 illustrates an operating procedure of a communication node in a wireless communication system according to an exemplary embodiment of the present invention.

Referring to FIG. 14, the communication node may determine a beam direction via a beam training procedure in step 1401. That is, the communication node may perform communication with a counterpart node, and may determine a beam direction for communication with the counterpart node in order to effectively perform transmission and/or reception of a signal. Here, the beam direction includes at least one of a transmission beam direction and a reception beam direction. For example, in a case of determining the reception beam direction, the communication node may receive a signal using a plurality of candidate beam directions, and may select an optimized beam direction using reception signal intensity of each beam direction. Also, in a case of determining the transmission beam direction, the communication node may transmit a signal using a plurality of candidate beam directions, and may select an optimized beam direction using reception signal intensity of each beam direction measured by the counterpart node.

After determining the beam direction, the communication node may proceeds to step 1403 in order to determine whether beamforming gain control is to be used. The beamforming gain control may be determined by the communication node or the counterpart node. For example, in a case where control of the reception beamforming gain is determined by the communication node, the communication node may measure signal quality of a reception signal, compare the signal quality with a threshold, and then determine whether to control the reception beamforming gain depending on the comparison result. Also, in a case where control of the transmission beamforming gain is determined by the communication node, the communication node may receive signal quality measured by the counterpart node, compare the signal quality with a threshold, and determine whether to control the transmission beamforming gain depending on the comparison result. Also, in a case where control of the beamforming gain is determined by the counterpart node, the communication node may determine whether to control the transmission beamforming gain or the reception beamforming gain via a message received from the counterpart node.

When the beamforming gain control is to be used, then the communication node proceeds to step 1405 in order to control the transmission beamforming gain by changing a beam width. For example, in a case where the beamforming gain increases, the communication node may reduce a beam width. In a case where the beamforming gain reduces, the communication node may increase the beam width. In other words, in the case where the beamforming gain increases, the communication node forms a relatively narrow beam, and in the case where the beamforming gain reduces, the communication node forms a relatively wide beam.

The exemplary embodiments of present invention provide a technique for controlling the transmission and/or reception beamforming gain of MS via signaling between a base station and the MS. According to another exemplary embodiment of the present invention, the above-described transmission and/or reception beamforming gain procedure is also applicable between MS and MS. In other words, the exemplary embodiments of present invention are applicable to Device to Device (D2D) communication. In this case, in the above procedure, MS on one side operates as the base station and MS on the other side operates as the MS of the above procedure. According to the exemplary embodiments of the present invention, since the gain of beamforming is adaptively controlled in a wireless communication system, performance improvement by beamforming is maximized.

Embodiments of the present invention according to the claims and description in the specification can be realized in the form of hardware, software or a combination of hardware and software.

Such software may be stored in a computer readable storage medium. The computer readable storage medium stores one or more programs (software modules), the one or more programs comprising instructions, which when executed by one or more processors in an electronic device, cause the electronic device to perform methods of the present invention.

Such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disc (CD), Digital Video Disc (DVD), magnetic disk or magnetic tape or the like. It will be appreciated that the storage devices and storage media are embodiments of machine-readable storage that are suitable for storing a program or programs comprising instructions that, when executed, implement embodiments of the present invention. Embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

Although the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the present invention should not be limited to the above-described exemplary embodiments but should be determined by not only the appended claims but also the equivalents thereof.

What is claimed is:

1. A method for operating a terminal in a wireless communication system, the method comprising:
   receiving, via a transceiver of the terminal from a base station, a first message for requesting information regarding whether the terminal supports at least one parameter related to a beamforming operation by the terminal; and
   transmitting, via the transceiver of the terminal to the base station, a second message comprising the information, wherein the information is used by the base station to control the beamforming operation of the terminal.

2. The method of claim 1, wherein the at least one parameter comprises at least one of beamforming gains supported by the terminal, beam directions supported by the terminal, or a range of the beamforming gains.

3. The method of claim 1, wherein the second message includes information regarding an adjustable range of a beamforming gain associated with antennas of the terminal.

4. The method of claim 3, wherein the information regarding the adjustable range of the beamforming gain comprises at least one of a maximum beamforming gain value, a minimum beamforming gain value, a number of sections between the maximum beamforming gain value and the minimum beamforming gain value, candidates of beamforming gain values, a beamforming precoding matrix set, or an index of a supportable beamforming precoding matrix set.

5. The method of claim 1, further comprising:
receiving, from the base station, a message for indicating to adjust the at least one parameter associated with antennas of the terminal.

6. The method of claim 5, wherein the at least one parameter comprises at least one of a beamforming gain associated with the antennas of the terminal or a beamwidth associated with the antennas of the terminal.

7. The method of claim 5, further comprising:
adjusting the at least one parameter by at least one of a digital beamforming or an analog beamforming.

8. The method of claim 5, wherein the message comprises at least one of an amount of increase of a beamforming gain, an amount of decrease of the beamforming gain, a gain value after the beamforming gain increases, or a gain value after the beamforming gain reduces.

9. A method for operating a base station in a wireless communication system, the method comprising:
transmitting, via a transceiver of the base station to a terminal, a first message for requesting information regarding whether the terminal supports at least one parameter related to a beamforming operation by the terminal; and
receiving, via the transceiver of the base station from the terminal, a second message comprising the information,
wherein the information is used by the base station to control the beamforming operation of the terminal.

10. The method of claim 9, wherein the at least one parameter comprises at least one of beamforming gains supported by the terminal, beam directions supported by the terminal, or a range of the beamforming gains.

11. The method of claim 9, wherein the second message includes information regarding an adjustable range of a beamforming gain associated with antennas of the terminal.

12. The method of claim 11, wherein the information regarding the adjustable range of the beamforming gain comprises at least one of a maximum beamforming gain value, a minimum beamforming gain value, a number of sections between the maximum beamforming gain value and the minimum beamforming gain value, candidates of beamforming gain values, a beamforming precoding matrix set, or an index of a supportable beamforming precoding matrix set.

13. The method of claim 9, further comprising:
transmitting, to the terminal, a message for indicating to adjust the at least one parameter associated with antennas of the terminal.

14. The method of claim 13, wherein the at least one parameter comprises at least one of a beamforming gain associated with the antennas of the terminal or a beamwidth associated with the antennas of the terminal.

15. An apparatus for a terminal in a wireless communication system, the apparatus comprising:
a transceiver; and
at least one processor coupled with the transceiver and configured to:
control the transceiver to receive, from a base station, a first message for requesting information regarding whether the terminal supports at least one parameter related to a beamforming operation by the terminal, and
control the transceiver to transmit, to the base station, a second message comprising the information,
wherein the information is used by the base station to control the beamforming operation of the terminal.

16. The apparatus of claim 15, wherein the at least one parameter comprises at least one of beamforming gains supported by the terminal, beam directions supported by the terminal, or a range of the beamforming gains.

17. The apparatus of claim 15, wherein the second message includes information regarding an adjustable range of a beamforming gain associated with antennas of the terminal.

18. The apparatus of claim 17, wherein the information regarding the adjustable range of the beamforming gain comprises at least one of a maximum beamforming gain value, a minimum beamforming gain value, a number of sections between the maximum beamforming gain value and the minimum beamforming gain value, candidates of beamforming gain values, a beamforming precoding matrix set, or an index of a supportable beamforming precoding matrix set.

19. The apparatus of claim 15, wherein the at least one processor is further configured to control the transceiver to receive, from the base station, a message for indicating to adjust the at least one parameter associated with antennas of the terminal.

20. The apparatus of claim 19, wherein the at least one parameter comprises at least one of a beamforming gain associated with the antennas of the terminal or a beamwidth associated with the antennas of the terminal.

21. An apparatus for a base station in a wireless communication system, the apparatus comprising:
a transceiver; and
at least one processor coupled with the transceiver and configured to:
control the transceiver to transmit, to a terminal, a first message for requesting information regarding whether the terminal supports at least one parameter related to a beamforming operation by the terminal, and
control the transceiver to receive, from the terminal, a second message comprising the information,
wherein the information is used by the base station to control the beamforming operation of the terminal.

22. The apparatus of claim 21, wherein the at least one parameter comprises at least one of beamforming gains supported by the terminal, beam directions supported by the terminal, or a range of the beamforming gains.

23. The apparatus of claim 21, wherein the second message includes information regarding an adjustable range of a beamforming gain associated with antennas of the terminal.

24. The apparatus of claim 23, wherein the information regarding the adjustable range of the beamforming gain comprises at least one of a maximum beamforming gain value, a minimum beamforming gain value, a number of sections between the maximum beamforming gain value and the minimum beamforming gain value, candidates of beamforming gain values, a beamforming precoding matrix set, or an index of a supportable beamforming precoding matrix set.

25. The apparatus of claim 21, wherein the at least one processor is further configured to control the transceiver to transmit, to the terminal, a message for indicating to adjust the at least one parameter associated with antennas of the terminal.

26. The apparatus of claim 25, wherein the at least one parameter comprises at least one of a beamforming gain associated with the antennas of the terminal or a beamwidth associated with the antennas of the terminal.

\* \* \* \* \*